W. D. GRAHAM.
WATERING TROUGH.
APPLICATION FILED JUNE 22, 1914.

1,176,214.

Patented Mar. 21, 1916.
3 SHEETS—SHEET 2.

Witnesses

Inventor
Williamson D. Graham,
By Richard B. Owen.
Attorney

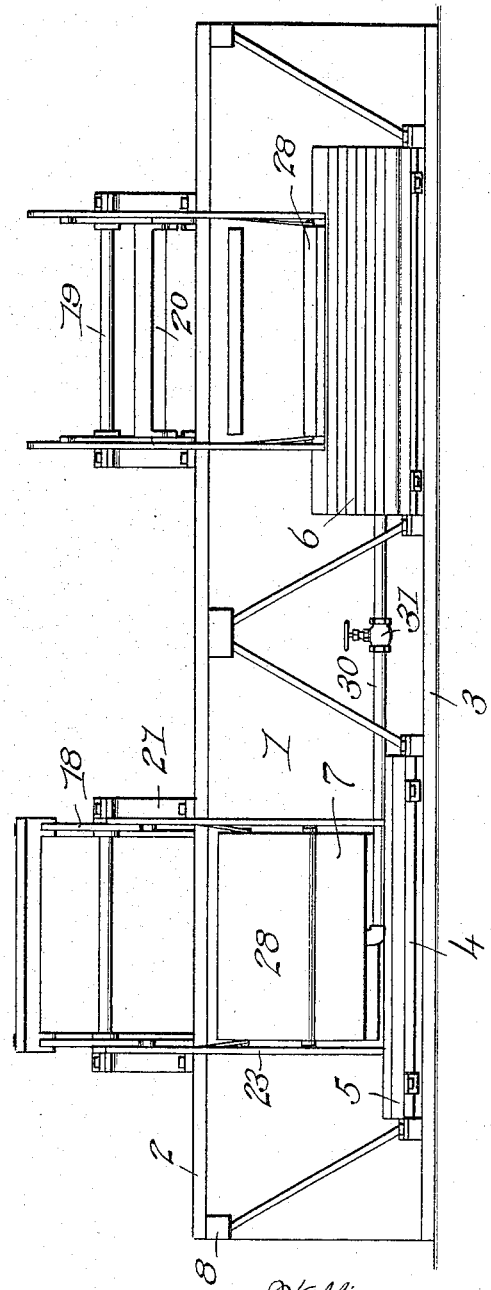

UNITED STATES PATENT OFFICE.

WILLIAMSON D. GRAHAM, OF CHICKASHA, OKLAHOMA.

WATERING-TROUGH.

1,176,214.  Specification of Letters Patent.  Patented Mar. 21, 1916.

Application filed June 22, 1914. Serial No. 846,616.

*To all whom it may concern:*

Be it known that I, WILLIAMSON D. GRAHAM, citizen of the United States, residing at Chickasha, in the county of Grady and State of Oklahoma, have invented certain new and useful Improvements in Watering-Troughs, of which the following is a specification.

My invention relates to improvements in watering troughs for live stock, and as its primary object, contemplates a structure including means; first, for filling the trough with water, such filling operation being controlled by the animal to be watered; second, for measuring and delivering a predetermined quantity of water to the trough; and finally, for returning to the water supply that portion of the water left within the trough after the animal to be watered has quit drinking.

The above and additional objects are accomplished by such means as are illustrated in their preferred embodiment, in the accompanying drawings, described in the following specification and then more particularly pointed out in the claims which are appended hereto and form a part of this application.

In describing my invention in detail reference will be had to the accompanying drawings wherein like characters denote like or corresponding parts throughout the several views, and in which:—

Figure 1:
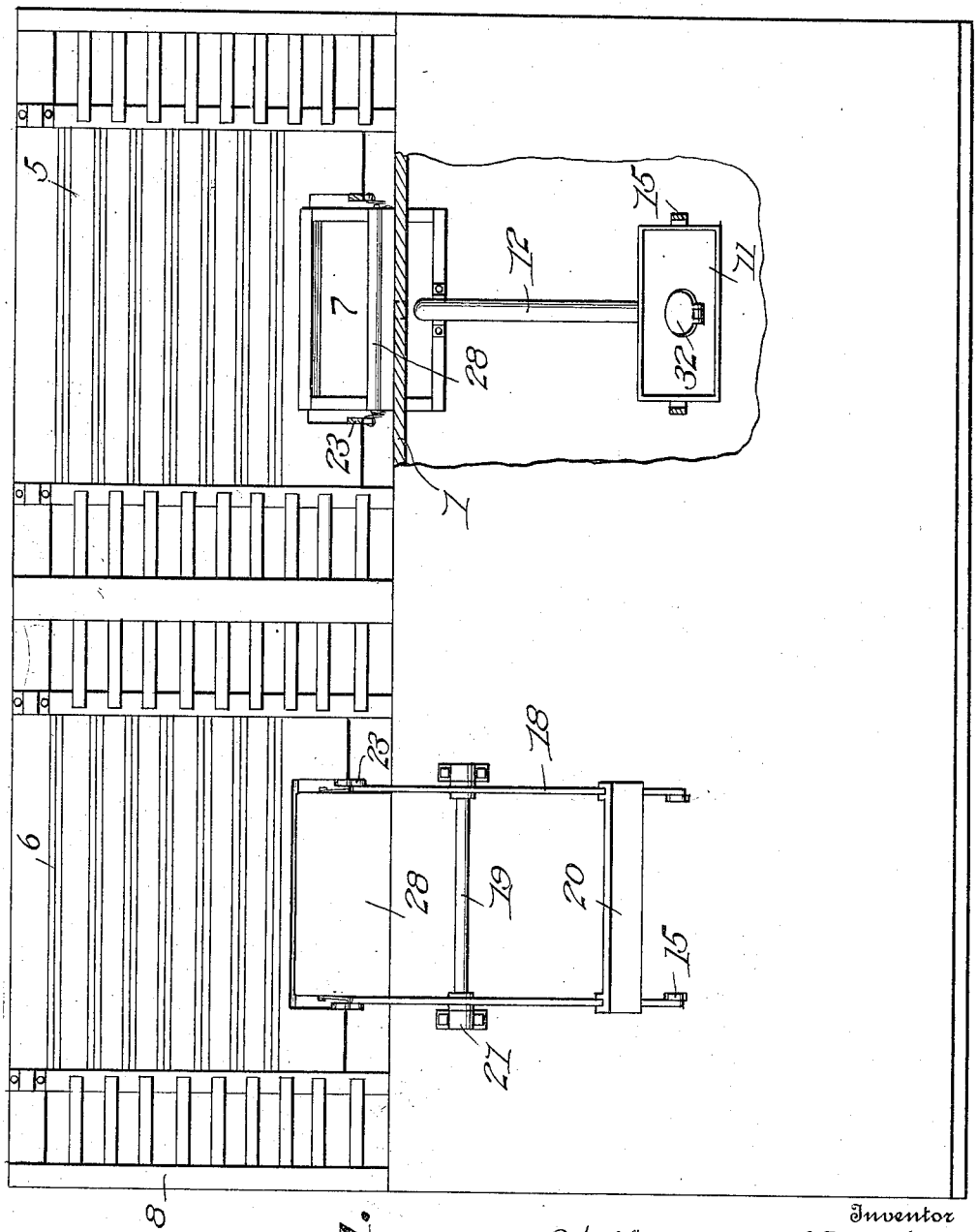
Figure 2:
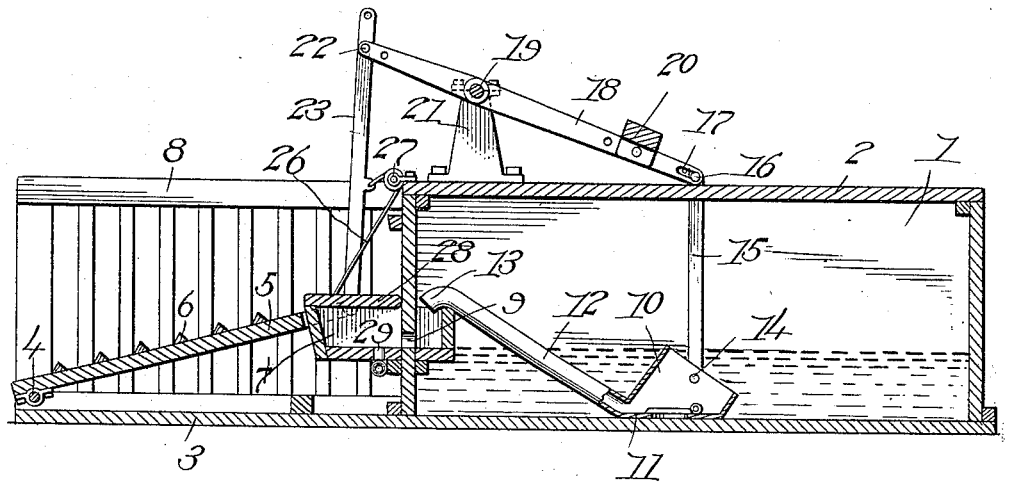
Figure 3:
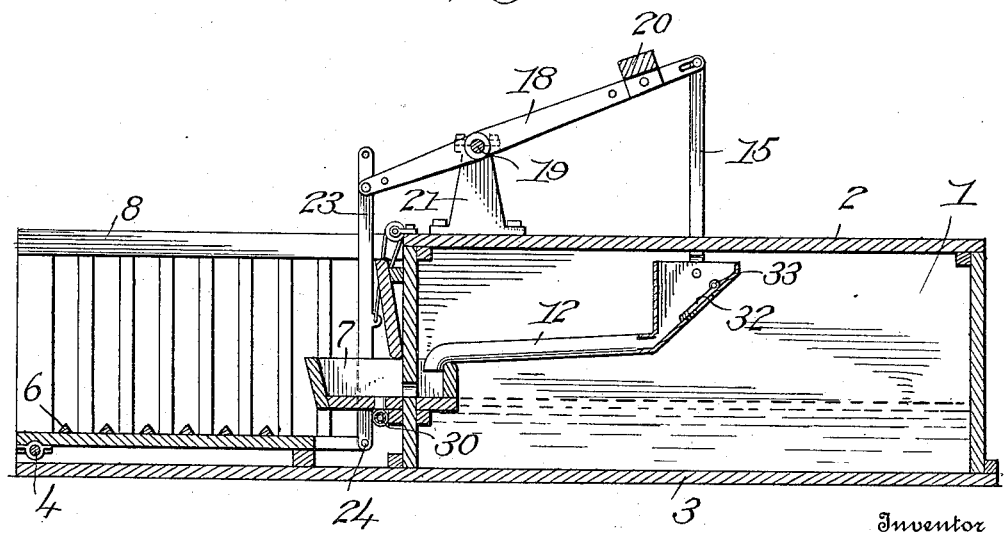

Figure 1 is a top plan view of a watering trough constructed in accordance with the present invention, the tank being partly broken away; Fig. 2 is a cross sectional view of the trough, the parts being shown in a position ready to be operated; Fig. 3 is a similar view, the parts being shown as positioned after having been operated; and Fig. 4 is a front elevation of the trough.

Referring now to the drawings by numerals, 1 designates the tank or receptacle within which the drinking water is poured or discharged, said tank or receptacle having a removable top 2 associated therewith. The base or floor of the tank 1 is extended forwardly beyond its front side as shown to advantage in Figs. 2 and 3, the forward extremity of the extended portion 3 having pivoted thereto as at 4 a treadle or platform 5, the top surface of which is corrugated or longitudinally ribbed as indicated at 6 to prevent slipping of the animal when treading thereupon in attempting to gain access to the trough, designated 7.

As shown to advantage in Figs. 1 and 4, extension 3 is partitioned off as indicated at 8, a treadle 5 being disposed in each compartment or stall formed by such partitioning. As the mechanism operating within and adjacent the tank 1 by movement of the treadle is the same for each stall, and for each watering trough 7 provided therefor, but one of the said mechanisms will be herein fully described.

The water within tank 1 is normally maintained upon a level with the floor or bottom of the trough 7, the trough extending into the tank 1 and being open thereto as indicated at 9, the opening being at the bottom of the trough as shown. A bucket or like movable receptacle 10 operates within the tank 1, the floor or bottom of the bucket being disposed at an inclination relative to the top thereof as indicated at 11 to serve as a means whereby the water within the bucket will flow by gravity into the feed pipe 12, the latter being attached to or integral with the bucket as shown, said pipe terminating in a spout 13 disposed to overlap the inner longitudinal side of the trough, the engagement between the spout and the said trough providing a fulcrum for the feed pipe 12 and bucket 10 associated therewith. Said bucket 10 has pivoted thereto as indicated at 14 a link 15 the opposite end of which has secured thereto a pin 16 operating within the slot 17 of a fulcrumed lever 18, the fulcrum point 19 of the lever being somewhat nearer the forward end thereof than the rear. A weight member 20 in the nature of a cross bar connects fulcrum levers 18, one of the said levers being disposed at each side of the bucket 10 and connected thereto as indicated at 12. Suitable brackets 21 rigid with the tank top serve as a support for the rod 19 to which the respective levers 18 are attached. The forward end of each lever 18 is pivotally connected as at 22 to a connecting link 23, the latter being attached at its opposite end as indicated at 24 to the free end of the treadle 5.

A flexible element 26 is attached to the connecting link 23 at a point intermediate its ends, the said flexible element operating over a pulley or the like designated 27 carried by the tank top, the opposite end of the said element being attached to a top or cover 28 for the exposed portion of the trough, said top or cover normally resting upon the top edge of the trough as shown to advantage in Fig. 2 to prevent the settling of dust or the like therein.

An outlet opening 29 is formed in the bottom of the trough, said outlet opening discharging into a pipe 30 leading again into the tank 1 at a point below the normal water level thereof, such arrangement, when a suitable valve 31 is manipulated, providing for a return to the tank of all water left within the trough after a watering of the animal has been accomplished.

As a means whereby bucket 10 is made incapable of floating, I provide a flap-valve 32 hingedly connected as at 33 to the inclined bottom 11 of the bucket, said valve opening inwardly as the bucket is lowered into the water by the weight of cross beam 20 the moment treadle 5 is relieved of the weight of the animal watered.

Operation of the device is as follows: Tank 1 being filled with water as shown to advantage in Figs. 2 and 3 may be acted upon by bucket 10 to provide for a delivery of a measured or predetermined quantity of water to the trough 7 by a depression of treadle 5. The animal to be watered, when attempting to reach trough 7 will stand upon treadle 5, cause said treadle to be depressed, and, as the treadle is connected to operating levers 18, it is apparent that the said levers will be swung or actuated, thus elevating bucket 10 from the position shown in Fig. 2 into the position shown in Fig. 3. The bucket being filled with the water formerly within the tank, will discharge, by gravity, its contents into the trough 7, thus permitting the animal standing upon treadle 5 to be watered. Simultaneously with the actuation of bucket 10, the top 28 of the trough is raised, flexible element 26 serving as the actuating medium therefor.

From the foregoing, taken in connection with the accompanying drawings it is apparent that little or no waste is in evidence, all water left within the trough being again discharged into the tank by the return pipe 30; that the filling of the trough is absolutely automatic and controlled entirely by the movement of the animal to be watered; and that the weight of the bucket 10 and the cross beam 20 will serve as a means whereby the former is automatically lowered into the water and the treadle 5 raised into the position shown in Fig. 2, the moment the animal standing upon the treadle removes his weight therefrom.

In reduction to practice, I have found that the form of my invention, illustrated in the drawings and referred to in the above description, as the preferred embodiment, is the most efficient and practical; yet realizing that the conditions concurrent with the adoption of my device will necessarily vary, I desire to emphasize the fact that various minor changes in details of construction, proportion and arrangement of parts may be resorted to, when required, without sacrificing any of the advantages of my invention, as defined in the appended claims.

Having thus fully described my invention, what I claim as new and desire to secure by Letters Patent, is:—

1. In a watering device, the combination with a receptacle containing water, and a trough disposed exteriorly of the receptacle and extending thereinto, said trough being disposed above the normal water level of the receptacle, of a closure for the exterior portion of the trough, a container operating within and normally disposed below the water level of the receptacle, pressure actuated means operable to simultaneously remove the closure from the trough and elevate the container above the water level to deliver by gravity a measured quantity of water to the trough, a connection between said pressure actuated means and said container, and a connection between said closure and said pressure actuated means.

2. In a watering device, the combination with a receptacle containing water, of a trough open to the receptacle, a container arranged within the receptacle, the said container being normally disposed below the water line thereof, a closure for the trough, pressure actuated means to elevate the container above the trough, means operating automatically upon a removal of the pressure to return the container to its normal position below the water level and the closure again to its normal position over the trough, a connection between said pressure actuated means and the container, and a connection between said closure and the pressure actuated means.

3. In a watering device, a receptacle containing water, a trough open to the receptacle and arranged to extend thereinto, a container operable within the receptacle, a delivery spout affixed to the container and resting upon the trough, means to raise the container from its normal immersed position within the receptacle to a position in a horizontal plane above that of the trough to deliver automatically the contents of the trough, the discharge spout of the container acting as a fulcrum therefor during movement, and means to return the water within the trough to the receptacle.

4. In a watering device, a receptacle containing water, a trough mounted partially within and partially without said receptacle, a container operable within said receptacle to deliver a determined quantity of water to said trough, a closure for said trough, and operating means connected with said container and with said closure to simultaneously operate said container and said closure in the manner specified.

WILLIAMSON D. GRAHAM.

Witnesses:
J. W. WILSON,
M. F. COURTNY.